United States Patent [19]

Check, III et al.

[11] Patent Number: 5,461,506
[45] Date of Patent: Oct. 24, 1995

[54] LIGHT VALVE SUSPENSIONS CONTAINING A TRIMELLITATE OR TRIMESATE AND LIGHT VALVES CONTAINING THE SAME

[75] Inventors: Joseph A. Check, III, West Bayshore; Robert L. Saxe, New York; Robert I. Thompson, Plainview, all of N.Y.

[73] Assignee: Research Frontiers Inc., Woodbury, N.Y.

[21] Appl. No.: 60,155

[22] Filed: May 11, 1993

Related U.S. Application Data

[63] Continuation-in-part of Ser. No. 972,826, Nov. 6, 1992, abandoned, and Ser. No. 972,830, Nov. 6, 1992, which is a continuation-in-part of Ser. No. 786,511, Nov. 1, 1991, abandoned.

[51] Int. Cl.[6] .................................................... G02B 5/23
[52] U.S. Cl. .................................................... 359/296
[58] Field of Search .............................. 359/51, 52, 296; 525/227; 524/315; 252/62.51

[56] References Cited

U.S. PATENT DOCUMENTS

| 4,273,422 | 6/1981 | Saxe | 359/296 |
| 4,407,565 | 10/1983 | Saxe | 359/296 |
| 4,430,239 | 2/1984 | Wyman | 252/62.51 |
| 4,442,019 | 4/1984 | Marks | 359/296 |
| 4,919,521 | 4/1990 | Tada et al. | 359/296 |
| 5,177,135 | 1/1993 | Wehner et al. | 524/315 |
| 5,319,028 | 6/1994 | Nakamura et al. | 525/227 |

*Primary Examiner*—Paul M. Dzierzynski
*Assistant Examiner*—Audrey Chang
*Attorney, Agent, or Firm*—Rosenman & Colin

[57] ABSTRACT

A light valve suspension contains a trialkyl trimellitate and/or trimesate and is used as such as the light modulating element of a light valve or droplets thereof are distributed in a light valve film used as the light modulating element of a light valve.

14 Claims, No Drawings

LIGHT VALVE SUSPENSIONS CONTAINING A TRIMELLITATE OR TRIMESATE AND LIGHT VALVES CONTAINING THE SAME

The present application is a continuation-in-part of copending U.S. applications Ser. Nos. 972,826 and 972,830, both filed Nov. 6, 1992, the contents of which are incorporated herein by reference thereto, which are each continuations-in-part of then U.S. application Ser. No. 786,511, filed Nov. 1, 1991, now abandoned.

The present invention relates to light valves and more particularly to improvements in the liquid suspension of particles contained within the light valve cell. The liquid suspension of particles may be used as such as the light modulating element of a light valve or a plurality of droplets of the liquid suspension may be encapsulated within a film, which is then used as the light modulating element of a light valve.

Light valves have been known for almost 60 years for the modulation of light. In Edwin Land's U.S. Pat. No. 1,955,923, the light valve was defined as a cell formed of two transparent sheets of insulating material spaced apart a small distance having electrically conductive coatings serving as electrodes on the inner (facing) surfaces of the sheets, and containing a "light valve suspension" comprising small particles suspended in a liquid suspending medium. As a practical matter, the light valve suspension also includes a polymeric stabilizer dissolved in the liquid suspending medium to prevent agglomeration of the particles. Nitrocellulose was proposed as a polymeric stabilizer in the beginning of the development of light valves. More recently, U.S. Pat. Nos. 4,164,365 and 4,273,422 and U.S. patent application Ser. No. 855,266, all of which are incorporated herein by reference thereto, disclose polymeric stabilizers in the form of copolymers or a mixture of polymers and/or copolymers.

In the absence of an applied electrical field, the particles in the light valve suspension exhibit random Brownian movement, and hence a beam of light passing into the cell is reflected, transmitted or absorbed, depending upon the nature and concentration of the particles and the energy content of the light. When an electrical field is applied through the light valve suspension in the light valve, the particles become aligned and for many light valve suspensions a substantial part of the light can pass through the cell.

Light valves have been extensively described in the literature. See U.S. Pat. Nos. 1,955,923, 1,963,496, 3,512,876 and 3,773,684. In the early days of television, Donal, Lagmuir and Goldmark thoroughly investigated the use of light valves in black and white as well as color television. See U.S. Pat. Nos. 2,290,582, 2,481,621, 2,528,510 and 2,645,976. A more modern use of the light valve is an alphanumeric display. Also, active matrix addressed high information content light valve displays, including flat color television set replacements for the cathode ray tube, have been proposed by the assignee of the present invention. Such displays could function in a manner partly analogous to commercially available flat color TV sets which use liquid crystals to produce images. Light valves have also been proposed for use in windows, eyeglasses and the like to control the amount of sunlight passing therethrough.

While the liquid light valve suspension can be used as such as the light-modulating element of a light valve, it is also possible to use as the light-modulating element a film having droplets of a liquid light valve suspension distributed in a polymer matrix. See U.S. Pat. Nos. 3,257,905, 3,341,274 and 4,919,521 and copending U.S. application Ser. Nos. 972,826 and 972,830, both filed Nov. 6, 1992, which are incorporated herein by reference thereto.

Thus, a film suitable for use in a light valve may comprise a cross-linked polymer matrix having droplets of a light valve suspension distributed in the matrix, the light valve suspension comprising particles suspended in a liquid suspending medium. The particles exhibit random Brownian movement in the absence of an electric field applied to the light valve suspension and become aligned in the presence of an electric field applied to the light valve suspension.

The film of the cross-linked polymer matrix having droplets of a light valve suspension distributed therein may be swollen with a suitable liquid. This improves the frequency response characteristics of the resulting film and reduces light scatter.

In a preferred embodiment of the invention, the cross-linked polymer matrix is a cross-linked polyorganosiloxane.

When the film is formed from a liquid cross-linkable polyorganosiloxane oligomer or polymer, it is preferred to emulsify a liquid cross-linkable polyorganosiloxane oligomer or polymer and a liquid light valve suspension with an organosiloxane/organic monomer copolymer as emulsifier, followed by treating a thin layer of the emulsion to cross-link the cross-linkable polyorganosiloxane oligomer or polymer, thereby forming the film.

A film suitable for use as the light modulating element of a light valve may also comprise a cross-linked polymer matrix that contains functional groups soluble in the liquid light valve suspension. In particular, the polymer matrix may be provided by a liquid cross-linkable copolymer emulsifier that includes such functional groups. The film may be formed by providing an emulsion of the liquid light valve suspension in a liquid cross-linkable copolymer emulsifier, followed by a cross-linking reaction. The liquid cross-linkable copolymer emulsifier not only provides the cross-linked polymer matrix, but also acts as an emulsifier in forming the film.

The film may also comprise a cross-linked polyorganosiloxane polymer matrix and the liquid light valve suspension distributed in the cross-linked polymer matrix may include a partially or fully fluorinated polymeric stabilizer, whereby the light scatter or "haze" of the light valve film is substantially reduced. Further improvements in the reduction of the haze may be obtained by providing the cross-linked polyorganosiloxane polymer matrix with aromatic groups and/or by swelling the film with a partially or fully fluorinated organic liquid. As used herein, the term "fluorinated" means a partially or fully fluorinated material.

A wide variety of organic and inorganic particles have been proposed for use in light valves, including mica, graphite, numerous metals, and halogen-containing light-polarizing crystals including, for example, certain metal halides, polyhalides of alkaloid acid salts and polyhalides of nitrogen-containing organic compounds, such as those disclosed in U.S. Pat. Nos. 4,877,313 and 5,002,701 which are incorporated herein by reference thereto. Preferably, the particles are anisometrically shaped.

Likewise, a wide variety of liquids have been proposed for use as all or part of the liquid suspending medium used to suspend the small particles and dissolve the polymeric stabilizer, such as esters, nitrobenzene, oils and other liquids. Thus, dibutyl phthalate has been proposed for use as the liquid suspending medium in U.S. Pat. Nos. 1,951,664 and 1,955,923 to Land and 3,625,869 to Marks. U.S. Pat. Nos. 4,025,163 and 4,113,362 to Saxe et al proposed the use of aromatic esters derived by reaction between an aromatic alcohol and an aliphatic acid as the liquid suspending medium for a light valve. U.S. Pat. No. 4,772,103 discloses highly branched esters as a liquid suspending medium.

U.S. Pat. No. 4,407,565 proposed to bring a light valve suspension into substantial gravitational equilibrium by using as the liquid suspending medium therefor an electrically resistive, inert, low molecular weight, liquid fluorocarbon polymer having a specific gravity at room temperature of at least about 1.5 and having at least about 50% of its atoms constituted by halogen atoms, at least 60% of the halogen atoms being fluorine and the balance chlorine and/or bromine, and an electrically resistive organic liquid miscible therewith. A wide variety of organic liquids can be used as the aforesaid miscible organic liquid. These include esters of aliphatic and aromatic acids and alcohols, e.g., alkyl acetates, such as isopentyl acetate and alkylphenyl acetates, such as p-nonylphenyl acetate, dioctylphthalate, diisodecyl adipate, dioctyl sebacate, as well as aromatic hydrocarbons, e.g., benzene and toluene, and silicones.

The miscible organic liquid preferably has a boiling point well above 150° C. so as to keep its vapor pressure relatively low in the normal operating temperature range for a light valve, which might be −40° C. to +85° C. The miscible liquid should also preferably have a very high electrical resistivity, preferably at least $10^{11}$ ohm-cm and more preferably $10^{12}$ ohm-cm or higher. The higher its electrical resistivity, the lower the voltage required to orient the suspended particles and the lower the power losses in the suspension. Finally, the miscible liquid should be compatible with other materials in the suspension and not degrade or be degraded by them or any of the cell components.

The present invention now provides a liquid light valve suspension for use as the light modulating element of a light valve, comprising a plurality of particles suspended in a liquid suspending medium, the liquid suspending medium comprising a liquid ester of formula (I) or (II):

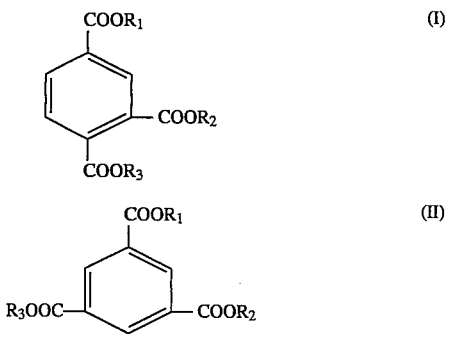

wherein $R_1$, $R_2$ and $R_3$ are each independently straight or branched chain alkyl having from 2 to 10 carbon atoms.

Preferably $R_1$, $R_2$ and $R_3$ are each independently straight chain propyl or butyl. Alternatively, $R_1$, $R_2$ and $R_3$ may be 2-ethylhexyl.

The present invention also provides a film comprising droplets of the liquid light valve suspension encapsulated in a polymer matrix.

The present invention further provides a light valve in which the light modulating element comprises the liquid light valve suspension or the film of the present invention.

The liquid esters are straight or branched chain trialkyl trimellitates (I) or straight or branched chain trialkyl trimesates (II). They may be prepared by esterifying the corresponding tricarboxylic acid or acid halide in a manner known per se.

The liquid esters (I) and (II) do not chemically or physically degrade the quality of the light valve suspension. The liquid esters (I) and (II) have a wide range of boiling points and freezing points. However, the boiling point is generally above 200° C. and preferably above 300° C. The freezing point is usually below 22° C. and preferably below 0° C.

When a liquid ester (I) or (II) is used in a light valve suspension that employs only one type of stabilizing polymer, it should preferably be a solvent for the polymer. When used in a light valve suspension which employs two stabilizing polymers, it should preferably be a solvent for both polymers.

The esters (I) and (II) can constitute all of the liquid suspending medium, but preferably the liquid suspending medium comprises other liquids, such as an electrically resistive, inert, low molecular weight, liquid fluorocarbon polymer having a specific gravity at room temperature of at least about 1.5 and having at least about 50% of its atoms constituted by halogen atoms, at least 60% of the halogen atoms being fluorine and the balance chlorine and/or bromine as described in U.S. Pat. No. 4,407,565 discussed above, a highly branched organic ester as described in U.S. Pat. No. 4,772,103 discussed above, and the like. In a preferred embodiment of the invention, the liquid light valve suspension comprises from about 1 to about 50%, most preferably from about 5 to about 40%, of the ester (I) and/or (II), and from about 35 to about 75%, most preferably from about 50 to about 70%, of the liquid fluorocarbon polymer, based on the total weight of the light valve suspension. In such cases, the esters (I) and/or (II) will provide all or part of the organic liquid miscible with the liquid fluorocarbon polymer. Of course, other miscible organic liquids can be used with the esters (I) and (II), such as neopentyl neopentanoate.

In the case of a light modulating element in the form of a film having droplets of the liquid light valve suspension distributed throughout the film, the esters (I) and/or (II) preferably constitute all or essentially all of the liquid suspending medium. Films useful as the light modulating element of a light valve are known. See e.g. U.S. Pat. Nos. 3,257,904, 3,341,274 and 4,919,521 and the aforesaid U.S. patent applications Ser. Nos. 972,826 and 972,830.

The use of the liquid esters (I) and (II) in a liquid light valve suspension is described in the following Examples. In these Examples, and in the specification and claims of this application, all parts, percentages and proportions are by weight, unless otherwise specified.

EXAMPLE 1

A. Preparation Of A Paste Of Crystals Of Dihydrocinchonidine Bisulfate Polyiodide (DCSI)

Colloidal particles of dihydrocinchonidine bisulfate polyiodide may be made as follows:

Solution A

Solution A is prepared by mixing a solution of

| | |
|---|---|
| 0.65 gm. | cesium iodide (CsI) |
| 3.00 gm. | dihydrocinchonidine bisulfate (DCS) |
| 10.00 gm. | 2-ethoxyethanol |
| 5.00 gm. | $H_2O$ |
| 0.08 gm. | 3% aqueous hydrogen peroxide | with 18.00 gm. of a 33⅓% solution of nitrocellulose in 2-ethyoxyethanol. The nitrocellulose should preferably be a mixture of low viscosity (18.6 cps) and high viscosity (15 seconds) types, 50% each.

Solution B

Solution B is prepared by mixing

| 4.00 gm. | 2-ethoxyethanol |
| 1.38 gm. | $I_2$ |
| 10.00 gm. | Tri-2-ethylhexyl)trimellitate ("trioctyltrimellitate") ("TOTM") | and shaking well for 15 minutes.

Solution A is poured into a plastic blender cup and Solution B is added while the blender is at high speed. In one minute or less, DCSI will form having a deep blue color in a gel-like wet paste. The resulting wet paste containing DCSI should be spread on a glass plate at an 8 mil thickness and allowed to dry at room temperature for at least one hour.

Dihydrocinchonidine bisulfate may be prepared by dissolving commercially available dihydrocinchloridine in a mixture of 1.5 parts of methanol and 0.32 parts of 97% $H_2SO_4$ and then evaporating to dryness. The resulting dihydrocinchonidine bisulfate is in the form of a light tan colored powder.

B. Processing Of The DCSI Paste

1. First grind the dried DCSI paste between two rotating steel plates to yield 20 gm.

2. Place the ground DCSI in a jar and add 150 gm. isopentyl acetate (IPA), shake for about 15 minutes and then place the jar into an ultrasonic generator for 10 hours.

3. After ultrasonicing, centrifuge the contents of the jar for one hour at 14,500 RPM and discard the supernatant.

4. Collect the sediment from the centrifuge tubes and add 150 gm. isopentyl acetate.

5. Centrifuge the ultrasoniced material for one-half (½) hour at 2500 RPM, discard the sediment and save the supernatant.

6. Centrifuge the supernatant material for one hour at 14,500 RPM and pour its supernatant off, leaving only the sediment. The sediment is then resuspended, one part sediment and four parts isopentyl acetate.

7. After thoroughly mixing, ultrasonic the suspension for ten hours.

8. Add to the above suspension enough TOTM so that for each 2.6 gms. of solid paste material, there will be 7.4 gms. of TOTM. The isopentyl acetate should now be evaporated under vacuum to leave only a 26% paste/TOTM concentrate. This "concentrate" is now ready to be processed to form the light valve suspension.

C. Preparation Of Liquid Light Valve Suspension

1. A copolymer consisting of 97% neopentyl acrylate/3% methylol acrylamide (NPA-MOAM), by weight, and having a molecular weight of approximately 25,000 is dissolved in TOTM, neopentyl neopentanoate or type 0.8 Halocarbon Oil, respectively, in the following weight percentages to form three solutions:

| a) TOTM/NPA-MOAM | 50/50% |
| b) Neopentyl neopentanoate/NPA-MOAM | 75/25% |

-continued

| c) Type 0.8 Halocarbon Oil/NPA-MOAM | 85/15% |

To reduce their viscosity, the above solutions are ultrasoniced for at least 50 hours.

2. How much the concentrate obtained in part B has to be diluted to form the light valve suspension comprising the particles and the stabilizing polymer depends upon the cell spacing and whether the light valve suspension is to be used in a transmissive, transflective or reflective mode. We have found that much less copolymer stabilizer is needed to stabilize a light valve suspension that has a relatively high percentage of DCSI paste and that preferably such paste percentage should be at least about 2.6%. To take advantage of this information and to also avoid too dark an off-state for the suspension, as well as to minimize the voltage needed to activate the suspension in a light valve, the cell spacing should preferably be about two mils or less.

3. Using the TOTM/NPA-MOAM 50/50% solution (a), add enough to the concentrate so that the final light valve suspension will contain 2.6% paste and 10% TOTM. Be sure to mix well. To this is added the 75/25% neopentyl neopentanoate/NPA-MOAM solution (b) so that the final light valve suspension will contain 10% neopentyl neopentanoate. Mix well. The 85/15% Type 0.8 Halocarbon Oil/NPA-MOAM solution (c) is now added and mixed well. The amount of this solution (c) is determined by the total percentage of stabilizing copolymer needed in the final light valve suspension. Halocarbon Oil (Type 0.8) alone is now added to bring the total percentage of the light valve suspension up to 100%. The final light valve suspension is now ultrasoniced for at least one hour.

| Paste | 2.6% |
| NPA-MOAM Polymer | 15.0 |
| TOTM | 10.0 |
| Neopentyl neopentanoate | 10.0 |
| Type 0.8 Halocarbon Oil | 62.4 |
| | 100.0% |

Type 0.8 Halocarbon Oil is described in Saxe, U.S. Pat. No. 4,407,565.

In this Example, the TOTM was included in the paste and it thus acted as a plasticizer when the paste was spread on the glass plate in part A. This technique may be used when forming pastes containing other particles.

EXAMPLE 2

A light valve suspension was prepared containing particles of pyrazine -2,5-dicarboxylic acid polyiodide (see U.S. Pat. No. 5,002,701) suspended in tri-n-propyl trimellitate and Type 0.8 Halocarbon Oil. The stabilizing polymer was a mixture of a trace of ¼ second type nitrocellulose and an AB block copolymer consisting of 95% neopentyl methacrylate and 5% of hydroxyethyl methacrylate (150,000 molecular weight). The liquid light valve suspension contained about 25% tri-n-propyl trimellitate, about 60% Type 0.8 Halocarbon Oil and about 13% of the block copolymer, all based on the total weight of the liquid light valve suspension.

EXAMPLE 3

Light valve suspensions prepared according to the procedures of Examples 1 and 2 were placed in a light valve cell and continuously activated for days. Light valve suspensions containing the esters (I) showed far less agglomeration than prior art liquids, such as dioctyl adipate. For example, tri-n-propyltrimellitate, tri-n-butyl trimellitate and tri-octyl trimellitate were shown to be superior to dioctyl adipate and diisodecyl adipate.

Further, some of the esters (I) and (II) used in the present invention have nearly equal or in some cases have higher electrical resistivities than dioctyl adipate. High resistivity is valuable in minimizing power consumption. A comparison of the resistivity of dioctyl adipate and various esters (I) is shown below in Table I:

TABLE I

| Liquid | Resistivity (in ohm-cms) |
| --- | --- |
| Dioctyl adipate | $1.5–5 \times 10^{10}$ |
| tri-n-pentyl trimellitate | $1.35 \times 10^{11}$ |
| tri-n-hexyl trimellitate | $7.35 \times 10^{10}$ |
| tri-n-propyl trimellitate | $5.5 \times 10^{9}$ |
| tri-n-butyl trimellitate | $1.5 \times 10^{10}$ |
| tri-octyl trimellitate | $1.4 \times 10^{12}$ |

Esters (I) and (II) where $R_1$, $R_2$ and $R_3$ are branched chain alkyl are useful, e.g., trioctyl (tri-2-ethylhexyl) trimellitate and the like, but are generally more viscous than the corresponding esters wherein $R_1$, $R_2$ and $R_3$ are straight chain alkyl.

EXAMPLE 4

A film suitable for use in a light valve was prepared as follows. One gram of a viscous suspension consisting of 10% pyrazine-2,5-dicarboxylic acid calcium polyiodide, 24% of a 97%/3% random copolymer of neopentyl acrylate/methylol acrylamide, 30% tri-n-butyltrimellitate and 36% di-2-ethylhexyl adipate are combined with 2 grams of dihydroxy terminated polydimethyl siloxane ($M_w$ 110,000), 0.06 grams of tetrabutylorthosilicate (tetra-butoxysilane) and 0.15 grams of dibutyltindilaurate. The combined ingredients are emulsified (by stirring, ultrasonic agitation, etc.), degassed under vacuum to remove entrapped air and then spread on a glass plate to cure. After curing for several hours at room temperature or 1 hour at 85° C. the film is ready.

The film is removed from the plate with a razor blade, allowed to freely absorb toluene and then placed between two conductive coated transparent substrates. Upon application of a suitable A.C. potential the film goes from the darkened to the transmissive state.

EXAMPLE 5

A film suitable for use in a light valve was prepared as follows. One gram of a viscous suspension consisting of 18.7% pyrazine-2,5-dicarboxylic acid calcium polyiodide, 25.1% of a graft copolymer made by reacting an A-B block copolymer of neopentylmethacrylate/hydroxyethyl methacrylate with maleic anhydride, and 56.2% tri-n-butyl trimellitate is combined with 1.5 g dihydroxy terminated polydimethyl siloxane ($M_w$ 150,000), 0.06 g of tetrabutylorthosilicate (tetrabutoxysilane) and 0.15 g of dibutyltindilaurate. The combined ingredients are emulsified (by stirring, ultrasonic agitation, etc.), degassed under vacuum to remove entrapped air and then spread on a glass plate to cure. After curing for several hours at room temperature or 1 hour at 85° the film is ready.

The film is removed from the plate with a razor blade, allowed to freely absorb Type 0.8 Halocarbon Oil (manufactured by Halocarbon Products, Hackensack, N.J.) and then placed between two conductive coated transparent substrates, which may be either glass or plastic e.g., polyethylene terephthalate.

Upon application of a suitable A.C. potential the film goes from the darkened to the transmissive state.

EXAMPLE 6

A film suitable for use in a light valve was prepared as follows. One gram of a suspension comprising 3.5% 2,5-dicarboxypyrazine calcium polyiodide, 22% 86:14 random copolymer of tert-butylacrylate: maleic anhydride and 74.5% tri-n-propylmellitate was combined with 1 gram of dihydroxy terminated polydimethyl siloxane ($M_w$ 36,000) and stirred by hand. The resulting emulsion (100K magnification) consisted of bubbles of suspension in a matrix. To this was added 0.02 g of tetraphenyl orthosilicate as crosslinking agent, and 0.1 g of dibutyl tin dilaurate as initiator. The resulting mass was stirred, then placed between two sheets of indium tin oxide coated glass (3 mil spacer) and clamped, then placed in the 85° C. oven to accelerate the curing reaction, although this system will also cure at room temperature. After curing, the cell was energized and it functioned as a light valve by opening and closing. This Example illustrates the use of a non-swollen film.

The light valve suspensions prepared according to the present invention showed no significant change in their excellent optical densities or optical density ratios after storage. These data demonstrate the excellent stability of the liquid suspending media used in the present invention.

While specific embodiments of the present invention have been illustrated, it will be appreciated that the invention is not limited thereto, since many modifications may be made by one skilled in the art which fall within the true spirit and scope of the invention.

We claim:

1. A liquid light valve suspension for a light valve comprising a suspension of particles suspended in an electrically resistive liquid suspending medium, said liquid suspending medium having a stabilizing polymer dissolved therein and bonded to or associated with said particles, said liquid suspending material comprising a liquid ester of the formula I or II:

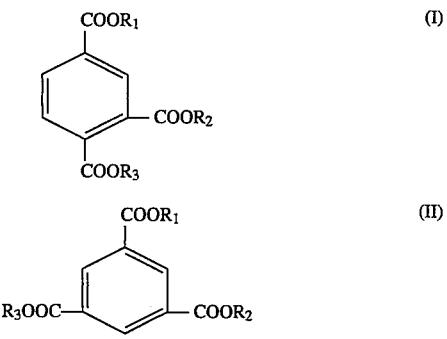

wherein $R_1$, $R_2$ and $R_3$ are independently straight or branched chain alkyl of from 2 to 10 carbon atoms.

2. The light valve suspension according to claim 1, wherein $R_1$, $R_2$ and $R_3$ are each independently straight chain alkyl of from 2 to 10 carbon atoms.

3. The light valve suspension according to claim 1, wherein said liquid ester is of formula (I).

4. The light valve suspension according to claim 3, wherein $R_1$, $R_2$ and $R_3$ are each n-propyl, n-butyl, n-pentyl or n-hexyl.

5. The light valve suspension according to claim 3, wherein $R_1$, $R_2$ and $R_3$ are each (2-ethyl)hexyl.

6. The light valve suspension according to claim 1, wherein said suspending medium also comprises an electrically resistive, inert, low molecular weight, liquid fluorocarbon polymer having a specific gravity at room temperature of at least about 1.5 and having at least about 50% of its atoms constituted by halogen atoms, at least 60% of the halogen atoms being fluorine and the balance chlorine and/or bromine.

7. A film suitable for use as the light modulating element of a light valve, comprising droplets of the liquid light valve suspension of claim 1 distributed in a polymer matrix.

8. A light valve having opposed cell walls and a light modulating element between said cell walls, wherein said light modulating element is the liquid light valve suspension of claim 1.

9. A light valve having opposed cell walls and a light modulating element between said cell walls, wherein said light modulating element is the liquid light valve suspension of claim 2.

10. A light valve having opposed cell walls and a light modulating element between said cell walls, wherein said light modulating element is the liquid light valve suspension of claim 3.

11. A light valve having opposed cell walls and a light modulating element between said cell walls, wherein said light modulating element is the liquid light valve suspension of claim 4.

12. A light valve having opposed cell walls and a light modulating element between said cell walls, wherein said light modulating element is the liquid light valve suspension of claim 5.

13. A light valve having opposed cell walls and a light modulating element between said cell walls, wherein said light modulating element is the liquid light valve suspension of claim 6.

14. A light valve having opposed cell walls and a light modulating element between said cell walls, wherein said light modulating element is the film of claim 7.

* * * * *